United States Patent [19]

Lothian et al.

[11] 4,216,496

[45] Aug. 5, 1980

[54] APPARATUS FOR DETECTING AND MEASURING INTERFERENCE IN TRANSMISSION SIGNALS

[75] Inventors: John S. Lothian; Michael D. Windram, both of Winchester, England

[73] Assignee: Independent Broadcasting Authority, London, England

[21] Appl. No.: 12,121

[22] Filed: Feb. 14, 1979

[30] Foreign Application Priority Data

Feb. 14, 1978 [GB] United Kingdom ............... 5851/78

[51] Int. Cl.² ............................................. H04N 5/44
[52] U.S. Cl. ..................................... 358/83; 358/160; 358/167; 358/188; 358/905
[58] Field of Search ................ 358/83, 160, 167, 188, 358/905

[56] References Cited

U.S. PATENT DOCUMENTS 4,096,529  6/1978  Baum et al. ........................ 358/167

Primary Examiner—Robert L. Richardson
Attorney, Agent, or Firm—Lawrence E. Laubscher

[57] ABSTRACT

A device for detecting co-channel interference in transmitted signals having sync pulses is disclosed, characterized in that the detected interference may be measured. The apparatus includes a detector for detecting the sync pulses, and measuring apparatus for determining a change in amplitude of the sync pulses. The measuring apparatus comprises a sampling device responsive to the detector for producing a signal indicative of the amplitude of each sync pulse. A first output is produced indicating the sum of two successive signals and a second output is produced indicating the difference of two successive signals. An analogue to digital converter produces a digital representation of each of the first and second outputs, respectively, which representations are converted to digital signals an arithmetic device. The digital signals are indicative of the magnitudes of the signals produced by the sampling device. A subtraction device subtracts the digital signals from each other to produce a control signal.

11 Claims, 14 Drawing Figures

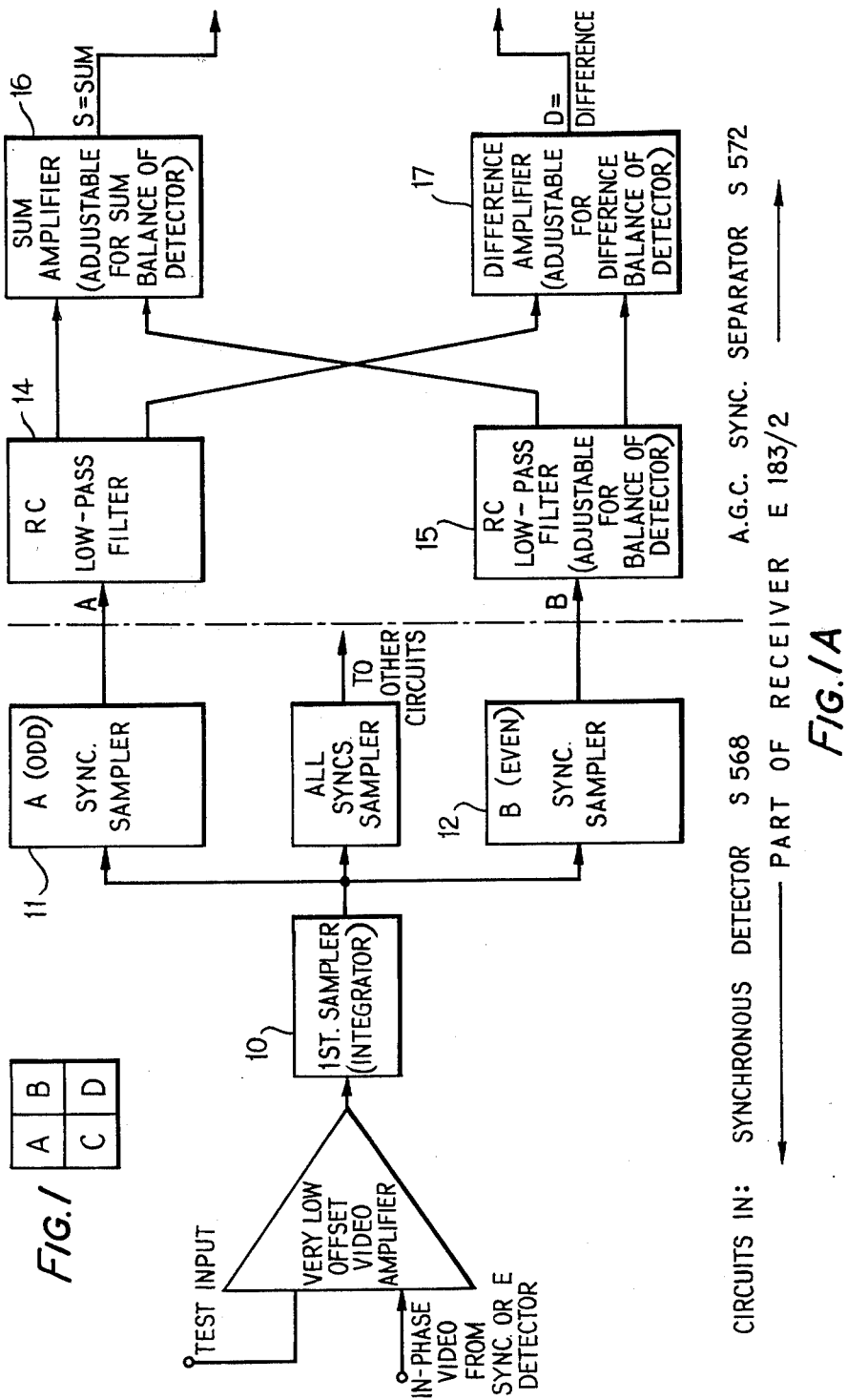

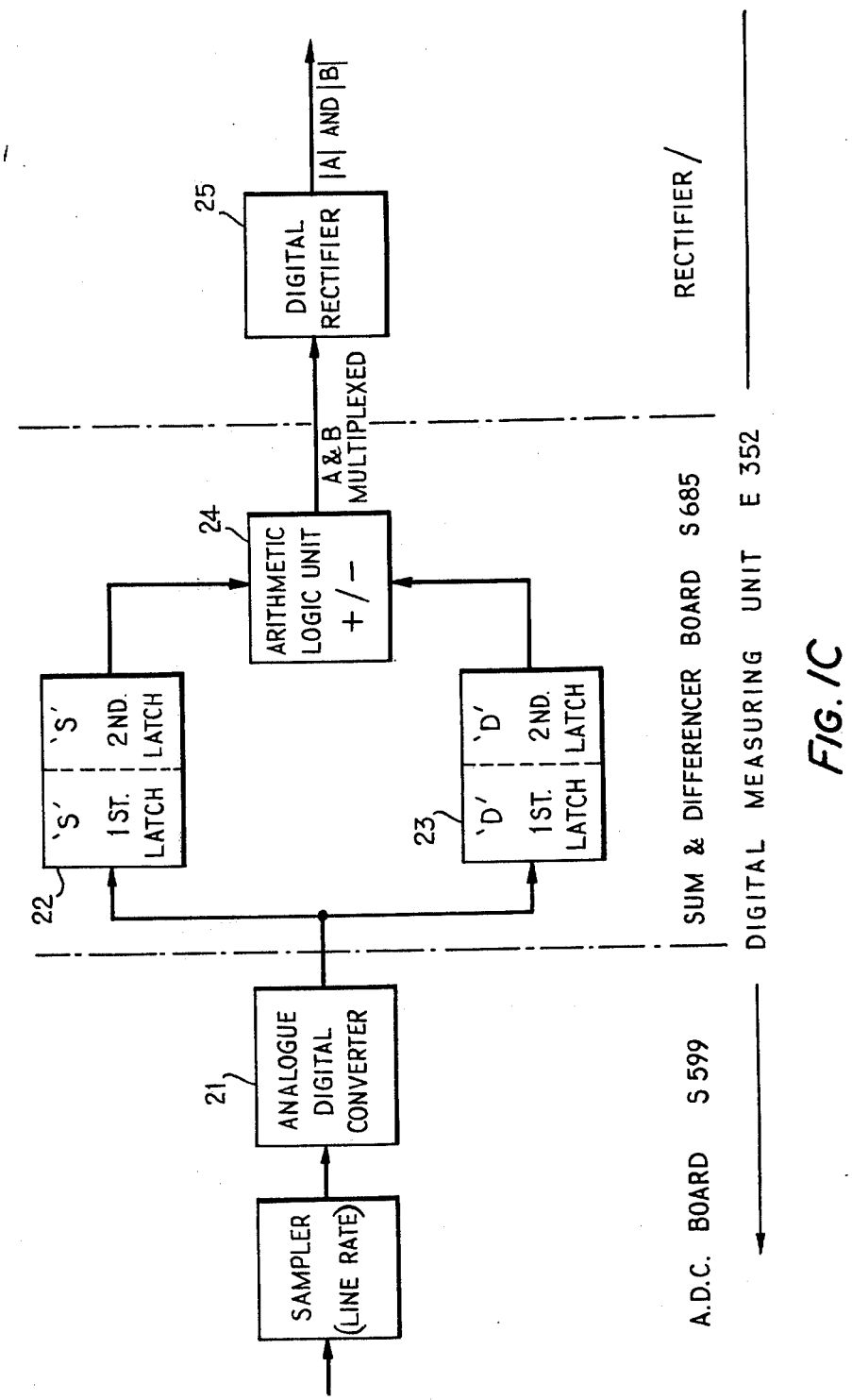
FIG. IC

H = LINE PERIOD = 64μS
FULL LINES REPRESENT CARRIER AND SIDE BANDS OF WANTED SIGNAL
DASHED LINES REPRESENT UNWANTED SIGNAL.

4,216,496

APPARATUS FOR DETECTING AND MEASURING INTERFERENCE IN TRANSMISSION SIGNALS

BACKGROUND AND SUMMARY OF THE INVENTION

The present invention provides apparatus for detecting co-channel interference in transmitted signals having sync pulses, comprising means for detecting the sync pulses, and measuring means for determining a change in amplitude of the sync pulses comprising sampling means responsive to the detecting means for deriving a signal indicative of the amplitude of each sync pulse, means for producing a first output indicative of the sum of two successive signals, means for producing a second output indicative of the difference of the two successive signals, analogue to digital converter means for producing a digital representation of the first and second outputs, arithmetic means for producing from the digital representations digital signals indicative of the magnitudes of the signals produced by the sampling means, and subtraction means for subtracting the digital signals from each other to produce a control signal.

One use of the present invention is in an adaptive aerial in which case the aerial, which is for receiving transmitted signals having sync pulses comprises a plurality of aerial segments, a plurality of attenuating means, apparatus for detecting co-channel interference, and control means responsive to the detecting apparatus for connecting a selected attenuating means to one of the aerial segments to reduce co-channel interference, the apparatus for detecting co-channel interference comprising means for detecting the sync pulses and measuring means for determining a change in amplitude of the synch pulses comprising sampling means responsive to the detecting means for deriving a signal indicative of the amplitude of each sync pulse, means for producing a first output indicative of the sum of two successive signals, means for producing a second output indicative of the difference of the two successive signals, analogue to digital converter means for producing a digital representation of the first and second outputs, arithmetic means for producing from the digital representations digital signals indicative of the magnitudes of the signals produced by the sampling means, and subtraction means for subtracting the digital signals from each other to produce a control signal.

A further use of the present invention is in an adaptive comb filter for filtering unwanted frequency signals from a T.V. video signal and comprises signal generating means for generating a signal at a frequency corresponding to the wanted frequency of signal; detector means responsive to the signal generating means and arranged to receive the T.V. video signal and to derive in-phase and phase quadrature signals therefrom; a delay line system for receiving the in-phase and phase quadrature signals, adding means for producing an output signal containing the wanted frequency, adjustable multiplier means connected between the delay line system and the adding means for altering the proportions of in-phase and phase quadrature signals fed to the adding means, and co-channel interference detecting means arranged to receive the T.V. video signal and connected to the multiplier means for altering the proportions of in-phase and phase quadrature signals so as to reduce the amount of unwanted frequency signals in the output from the adding means.

The present invention relates to apparatus for detecting and measuring interference signals in audio or video transmission signals.

BRIEF DESCRIPTION OF THE FIGURES

Features and advantages of the present invention will become apparent from the following description of embodiments thereof, given by way of example, when taken in conjunction with the accompanying drawings, in which:

FIGS. 1A to 1D form a block diagram of a measuring circuit;

The embodiments to be described both rely on measuring the amount of co-channel interference (C.C.I.) and then, on the basis of the amount of CCI, either altering an adaptive aerial in the case of U.H.F. signals or altering an adaptive filter for video signals. Both embodiments could be combined if required.

Thus, the basis of the two embodiments is the measuring circuit shown in FIG. 1 and this will now be described in more detail. The measuring circuit detects the sync pulses in a television signal and measures the amplitude of the sync pulses. The amplitude should be constant, but in the presence of C.C.I. a beat signal is introduced on to the sync pulse and magnitude of the synch pulse is altered.

The apparatus has to be capable of detecting changes of the order of 0.1% and this is difficult to achieve using filtering techniques. The present apparatus uses a summing and differencing technique in conjunction with digital measuring to achieve the desired accuracy.

Figure 1B:
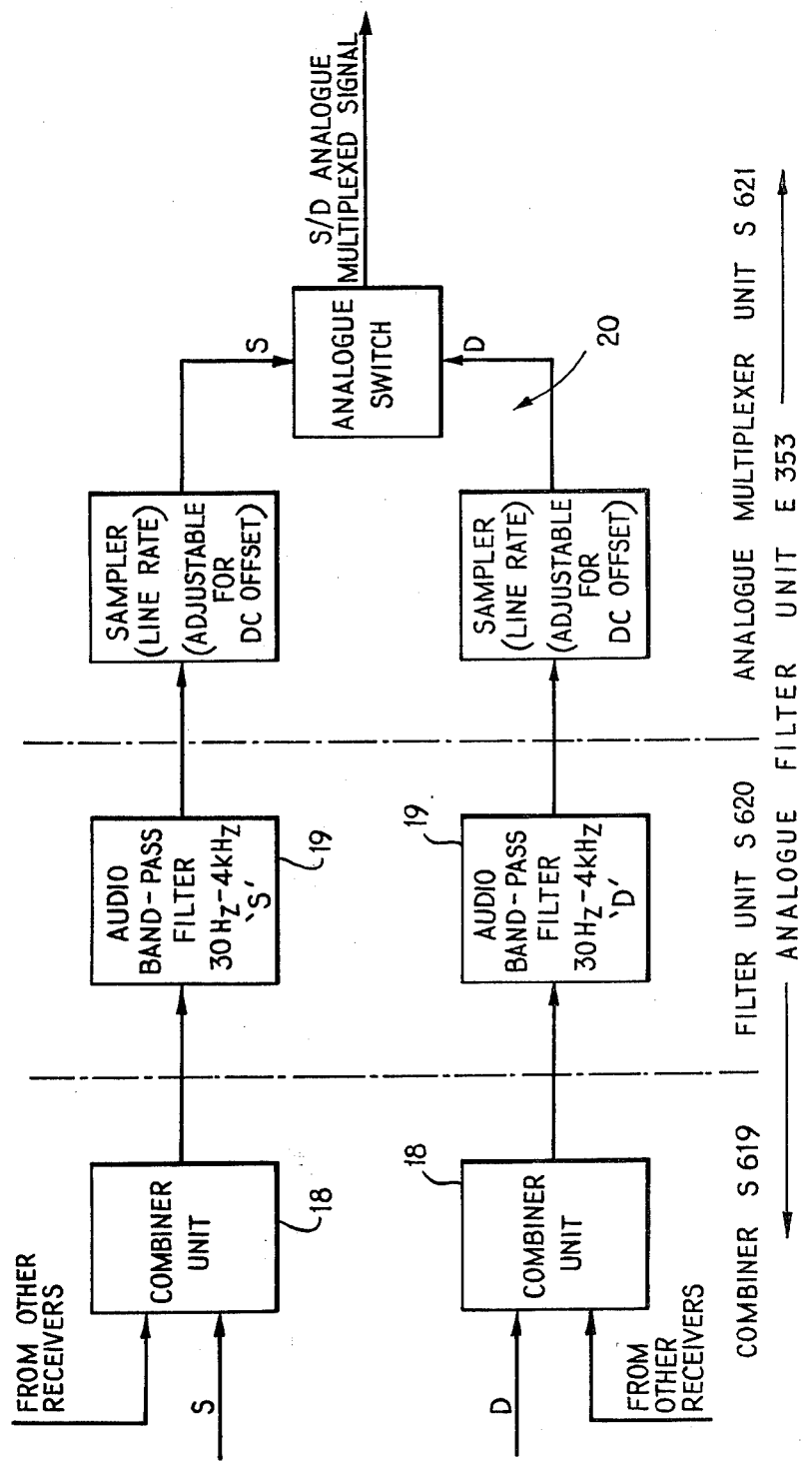
Figure 1D:
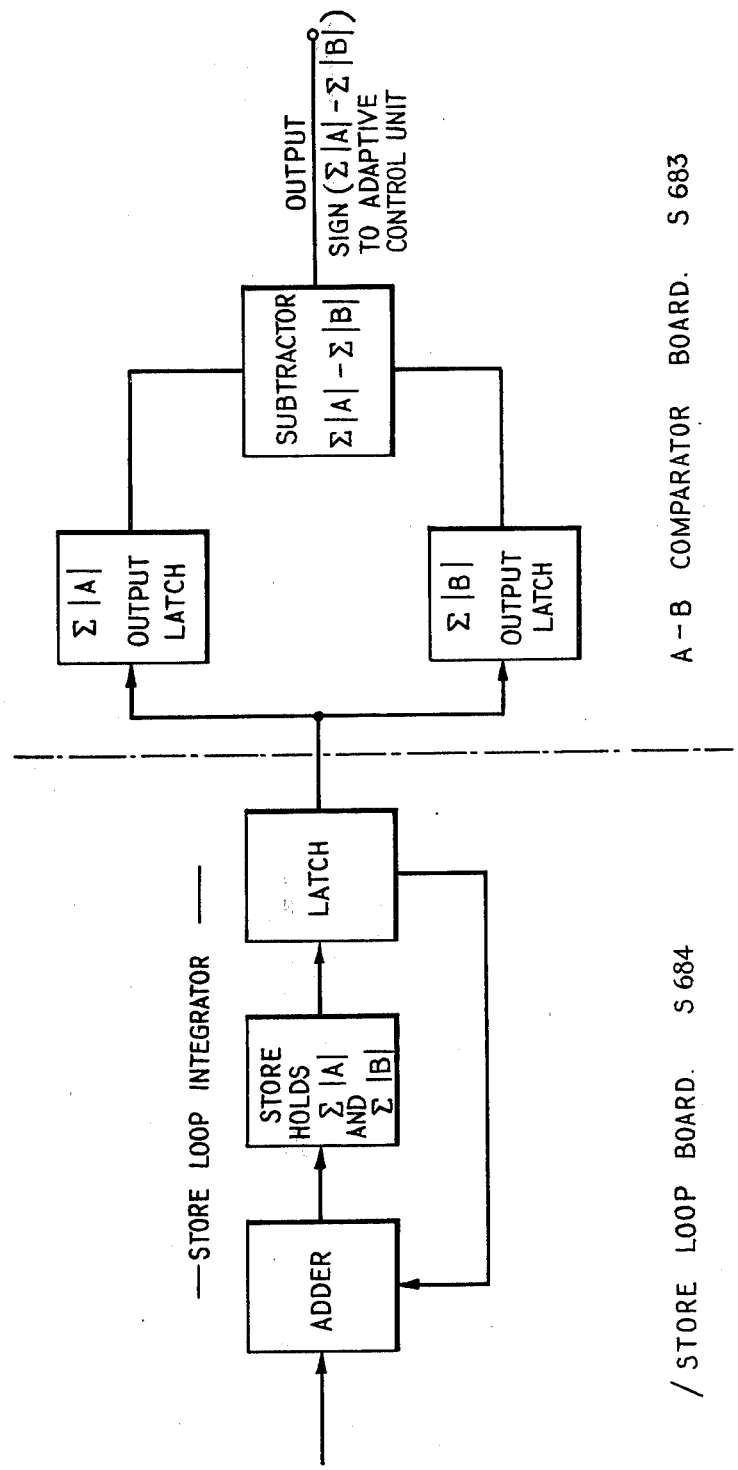

Turning now to FIG. 1, the sync pulses of a television signal are detected and sampled in a first sampling circuit 10 operating at line frequency. The circuit 10 also averages the magnitude of the sync pulse and produces an output pulse for each sync pulse. These output pulses are then sampled in further sampling circuits such that alternate pulses are sampled by different sampling circuits. In this case, only two further sampling circuits 11 and 12 are provided and so every second pulse is sampled by the circuit 12 with the other pulses sampled by the circuit 11.

The further circuits 11 and 12 are preferably in the form of sample and hold circuits operating at a frequency of one half line frequency, so that two successive sync pulses can be compared with each other to detect changes in amplitude of the sync pulses. The pulses passing through the circuit 11 will be identified as pulses A while the pulses passing through the circuit 12 will be identified as pulses B.

The A and B pulses are passed through low pass filters 14 and 15 which smooth the leading edges of the pulses and act as interpolation filters so that the sampling circuits 11 and 12 do not need to be accurately locked to the frequency of sampling of the circuit 20. The A and B pulses are then fed to a summing amplifier 16 and a differencing amplifier 17. The outputs S and D from the amplifiers 16 and 17, respectively, are fed through combiners 18 and band pass filters 19 to a circuit generally indicated by reference numeral 20 which convert the parallel S and D outputs into serial S and D signals. These serial signals are then sampled and converted to digital quantities by an analogue to digital converter 21.

The band pass filters 19 are chosen so that the measuring apparatus responds to co-channel interference. There are a number of causes of low frequency interference, and so the lower limit of the filters is chosen to discriminate against these other sources of interference. At present the lower limit is set at 30 Hz, but it could be as low as 20 Hz.

Figure 2:
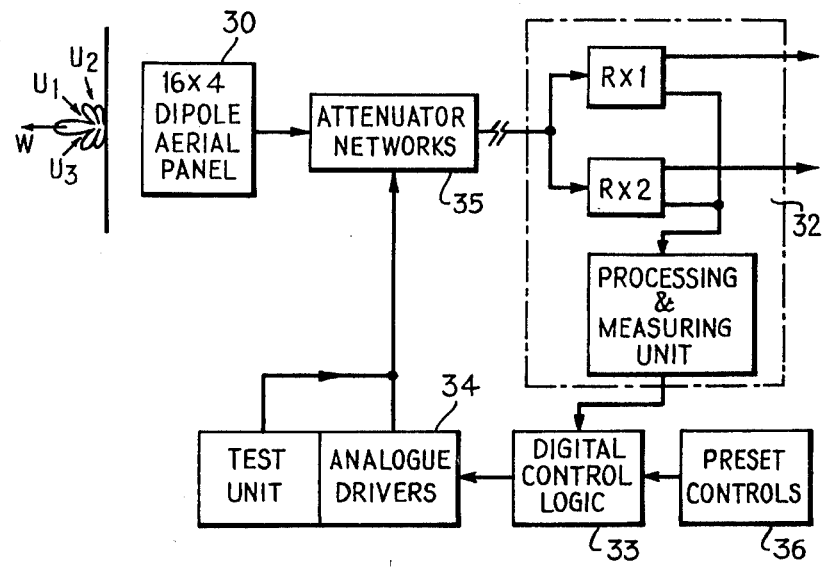
FIG. 2 shows a block diagram of one use of the circuit shown in FIG. 1.

The S and D signals, now in digital form, are fed through parallel latches 22, 23 to an arithmetic logic unit 24 which combines the S and D signals and produces outputs indicative of the amplitudes of the original A and B signals. Since two operations are required in order to produce outputs indicative of A and B, two latches 22 and two latches 23 are provided to time the sequence of operations. The output signals from unit 24 have both magnitude and sign. Since the sign is not required, the output signals are rectified in a digital rectifier 25, and then a plurality of output signals indicative of A are added together and a plurality of output signals indicative of B are added together using the adder, store and latch of FIG. 1d. These signals can then be subtracted from each other to give an output signal whose magnitude and sign are obtainable. In some circumstances only the sign of the difference is of importance and so the magnitude can be ignored. A measuring circuit such as that described above has a number of uses. One is to provide signals for altering an adaptive aerial array, and FIG. 2 shows a block diagram of such a system working on two channels.

Each channel is provided with sampling circuits and summing and differencing amplifiers as described above in relation to circuits 10 to 17. Combiner units 18 (FIG. 1) are then provided so that the subsequent circuitry is common to the or each channel.

The aerial array 30 comprises a plurality of dipole aerials in this case 64 arranged in four rows of sixteen. The signals received by the array 30 are processed and measured as described above in apparatus 32 and the output signal, either its sign or both its sign and magnitude, is fed to a digital control unit 33 which provides control signals which are fed via a plurality of analogue drives 34 to a network 35 of attenuators which alter the outputs from the aerial array 30 and thus effectively steer the aerial so that the desired signal is received and nulls are positioned so as to blank out undesired signals. The system is thus a closed loop system in which the effective aerial pattern is modified automatically to minimize interference.

The system operates on what is essentially a hill climbing operation. This means that a change is made to the attenuator network and the measuring apparatus registers whether this is an improvement or not. This is a continuously operating process which effectively nulls the interference and then keeps it nulled.

To start the process, preset controls 36 are provided which provide starting conditions giving a reasonable aerial pattern before optimization is started. The digital control unit 33 produces control signals on the basis of a suitable algorithm which is chosen depending on the likely C.C.I. to be encountered.

The attenuator network 35 will now be described in more detail in relation to FIGS. 3, 4 and 5.

The attenuator network 35 comprises a plurality of complex attenuator circuits equal in number to the number of columns of dipole aerials in the array. FIG. 3 shows a block diagram of one such complex attenuator circuit from which it will be seen that an input signal A from a dipole aerial is transformed into a complex output in the form $(X+jY)A$. The coefficients X and Y can be altered from $-1$ to $+1$ independently depending on the control signals applied to the attenuators shown in FIG. 3. The 90° phase shift introduced in the attenuator circuit is produced by choosing a suitable filter and then determining the length of co-axial line required so that the difference between the line and the filter is 90°. This is shown diagramatically in FIG. 5.

Figure 4:
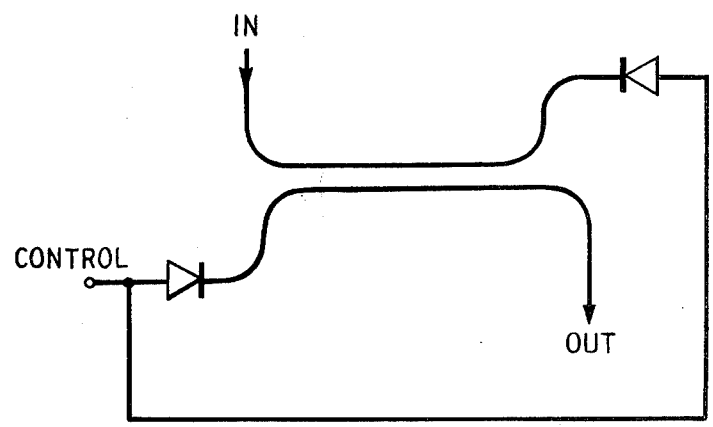
FIG. 4 shows one of the attenuators of the circuit shown in FIG. 3.
Figure 5:
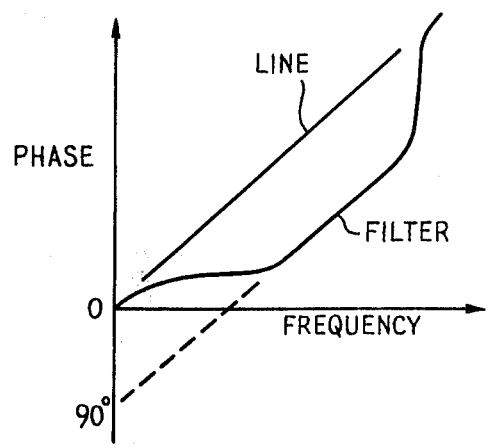
FIG. 5 is a diagram showing the phase shift introduced by the attenuator.

Each of the attenuators is as shown in FIG. 4 and comprises a 3dB wire-line coupler and two diodes. The control voltage to the diodes in the coupler shown in FIG. 4 is derived from the analogue driver circuit 34 of FIG. 2. This control voltage regulates the current in the diodes so that their impedance varies on either side of a set value for example 50 ohms.

Figure 3:
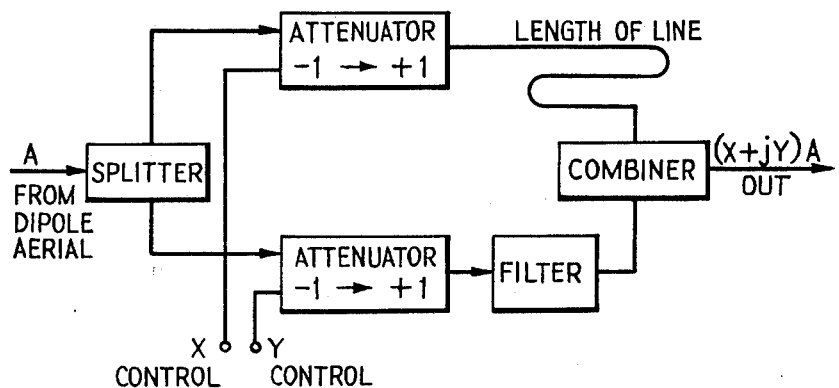
FIG. 3 shows a block diagram of a complex attenuator circuit.

Using a complex attenuator circuit such as that shown in FIG. 3 allows one to have complete control of the magnitude and phase of the output from each dipole aerial of the array, and therefore nulls can be positioned, in such a manner as to substantially remove co-channel interference.

A further use of the measuring circuit shown in FIG. 1 is for providing control signals to an adaptive comb filter which can be used in addition to the adaptive aerial array described above.

Figure 6:
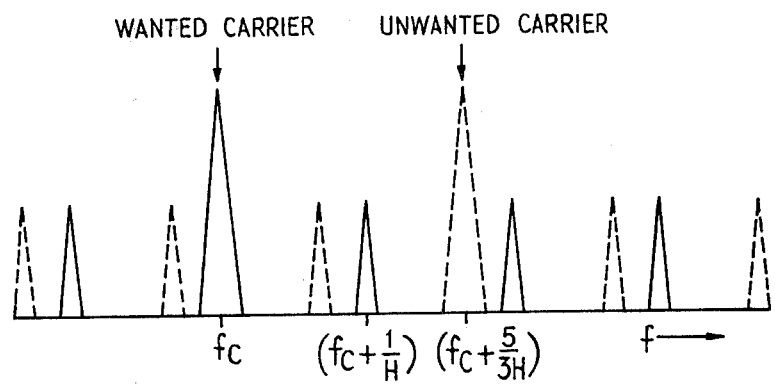
FIG. 6 is a diagram illustrating an offset C.C.I where a nominal 5/3 or 10/3 line frequency offset exists between the unwanted and wanted signals.

The C.C.I. supression techniques to be described are applicable to the case of offset C.C.I. that is to say where a nominal 5/3 or 10/3 line frequency offset exists between the unwanted and wanted signals as shown in FIG. 6. From this Figure it will be seen that the unwanted carrier and sidebands are shown in broken lines and a simple comb filter could be designed in order to remove the unwanted carrier and sidebands. However, it has been found that the offset frequency between the wanted and unwanted carriers may deviate from the nominal 5/3 line frequency. In the apparatus to be described, the frequency at which cancellation occurs is changed automatically by detecting the C.C.I. beat frequency. The apparatus thus tracks the interfering signal and follows variations in its frequency.

Figure 7:
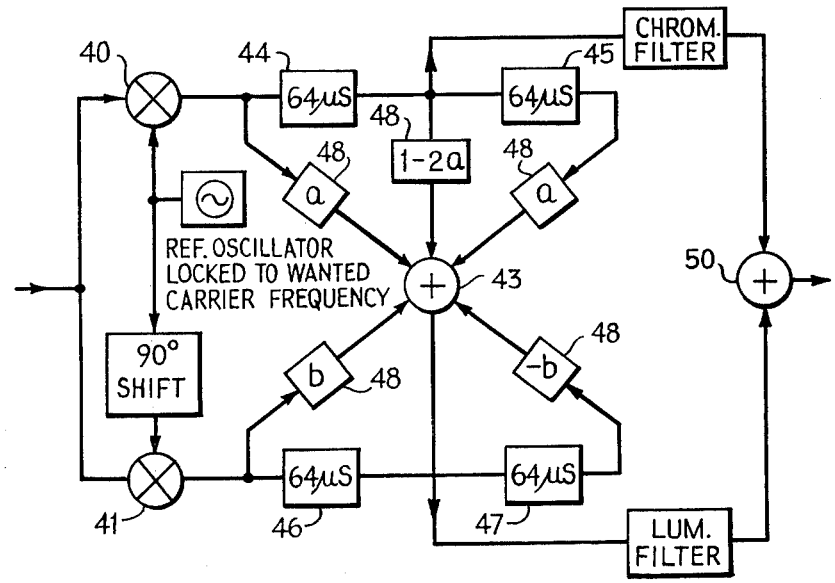
FIG. 7 shows an adaptive comb filter in block diagram form.

FIG. 7 shows in block diagram form an adaptive comb filter. An input color T.V. video signal received, for example, by an aerial is fed to a synchronous detector comprising an in-phase detector 40 and a quadature detector 41. The output from the in-phase detector contains the wanted and unwanted signals whereas the output from the quadature detector which is 90° phase shifted with respect to the in-phase detector output contains the unwanted signal. These output signals are fed to a delay line system which cancels the unwanted carrier as well as both the unwanted sidebands. This is achieved by using delay lines which delay the signals by one line period, in this case 64 μS.

From FIG. 7 it will be seen that a single adder 43 is used to combine signals from the inputs and outputs of two delay lines 44, 45 which are fed from the in-phase detector 40 and the output from the quadature 41 together with the output from two delay lines 46, 47. The output of the adder gives a corrected filtered video signal. In order to alter the frequency of the filter at which cancellation occurs the inputs to the adder 43 are fed through multiplier units 48 which are controlled from the output of the measuring circuit shown in FIG. 1.

Figure 8:
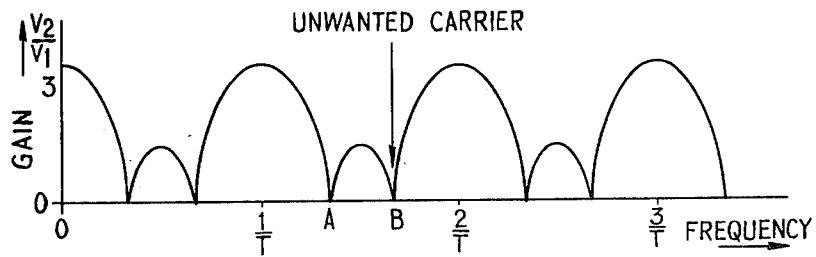
FIG. 8 is a diagram of the frequency spectrum of a suitable comb filter.

The frequency response of a suitable comb filter is shown in FIG. 8 and the position of the unwanted carrier is marked. Changing the co-efficients applied by the multiplier units 48 alters the position of the cancellation frequencies A and B shown in FIG. 8.

Figure 9:
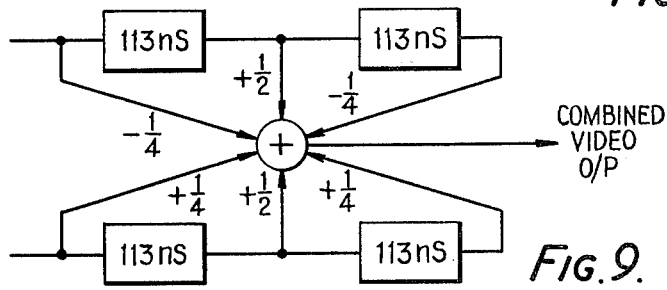
FIG. 9 shows a circuit for combining the corrected video output signal with an uncorrected output signal in the circuit of FIG. 7.

Returning now to FIG. 7, it will be seen that the corrected video output signal is filtered in a luminance filter and combined with a filtered uncorrected output signal in a circuit 50 which is shown in more detail in FIG. 9.

The general arrangement of the circuit in FIG. 9 is similar to that shown in FIG. 7, but in this case the delay lines have delays of 113nS.

Figure 10:
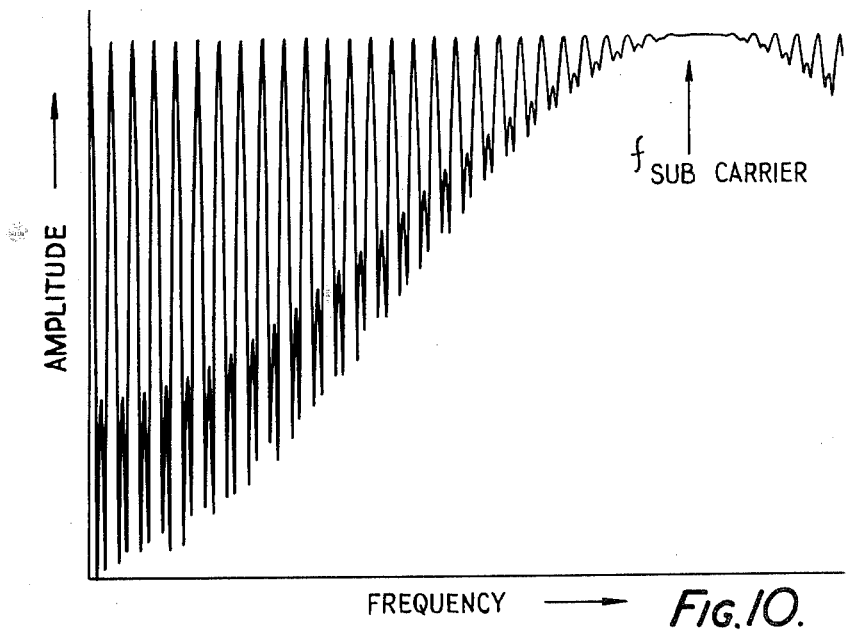
FIG. 10 shows the complete frequency response of the comb filter and combining filter.

FIG. 10 shows the complete frequency response of the comb filter and combining filter.

We claim:

1. Apparatus for detecting co-channel interference in transmitted signals having sync pulses, comprising means for detecting the sync pulses, and measuring means for determining a change in amplitude of the synch pulses comprising sampling means responsive to said detecting means for deriving a signal indicative of the amplitude of each sync pulse, means for producing a first output indicative of the sum of two successive said signals, means for producing a second output indicative of the difference of the two successive said signals, analogue to digital converter means for producing a digital representation of said first and second outputs, arithmetic means for producing from said digital representations digital signals indicative of the magnitudes of said signals produced by the sampling means, and subtraction means for subtracting said digital signals from each other to produce a control signal.

2. Apparatus according to claim 1, and comprising multiplying means for feeding said first and second outputs to said analogue to digital converter means as a multiplexed signal.

3. Apparatus according to claim 2, wherein said arithmetic means comprises two parallel paths each of which contains delay means, one path being arranged to receive the digital representation of said first output, and the other the digital representation of said second output, and an arithmetic logic unit connected with said delay means for computing digital values used to produce said digital signals.

4. Apparatus according to claim 3, and comprising means connected to an output from said arithmetic logic unit for producing from said digital values said digital signals in the form of signals which represent the sum of the modulus of the signals derived by the sampling means.

5. An adaptive aerial for receiving transmitted signals having sync pulses comprising a plurality of aerial segments, a plurality of attenuating means, apparatus for detecting co-channel interference, and control means responsive to said detecting apparatus for connecting a selected attenuating means to one of said aerial segments to reduce co-channel interference, said apparatus for detecting co-channel interference comprising means for detecting the sync pulses and measuring means for determining a change in amplitude of the sync pulses comprising sampling means responsive to said detecting means for deriving a signal indicative of the amplitude of each sync pulse, means for producing a first output indicative of the sum of two successive said signals, means for producing a second output indicative of the difference of the two successive said signals, analogue to digital converter means for producing a digital representation of said first and second outputs, arithmetic means for producing from said digital representations digital signals indicative of the magnitudes of the signals produced by said sampling means, and subtraction means for subtracting said digital signals from each other to produce a control signal.

6. An adaptive aerial according to claim 5, and comprising control devices arranged to be preset to provide the initial connection arrangement of aerial segments and attenuating means.

7. An adaptive aerial according to claim 5, wherein each of the attenuating means comprises an attenuator circuit arranged to be connected to one of the aerial segments and comprising means for transforming an output signal A from said one of the aerial segments into a complex output in the form $(X+jY)$ A, and means responsive to said control means for altering the X and Y coefficients.

8. An adaptive aerial according to claim 7 wherein each of said means responsive to said control means comprises a 3dB wire-line coupler.

9. An adaptive comb filter for filtering unwanted signals from a T.V. video signal comprises signal generating means for generating a signal at a frequency corresponding to the wanted frequency of signal; detector means responsive to said signal generating means and arranged to receive said T.V. video signal and to derive in-phase and phase quadrature signals therefrom; a delay line system for receiving said in-phase and phase quadrature signals, adding means for producing an output signal containing the wanted frequency, adjustable multiplier means connected between the delay line system and the adding means for altering the proportions of in-phase and phase quadrature signals fed to the adding means, and co-channel interference detecting means arranged to receive the T.V. video signal and connected to said multiplier means for altering the proportions of in-phase and phase quadrature signals so as to reduce the amount of unwanted frequency signals in said output from the adding means.

10. An adaptive comb filter according to claim 9, wherein the delay line system uses dealy lines for delaying signals by one line period.

11. An adaptive comb filter according to claim 9, wherein the co-channel interference detecting means comprises means for detecting the sync pulses, and measuring means for determining a change in amplitude of the sync pulses comprising sampling means responsive to said detecting means for deriving a signal indicative of the amplitude of each sync pulse, means for producing a first output indicative of the sum of two successive said signals, means for producing a second output indicative of the difference of the two successive said signals, analogue to digital converter means for producing a digital representation of said first and second outputs, arithmetic means for producing from said digital representations digital signals indicative of the magnitudes of the signals produced by the sampling means, and subtraction means for subtracting said digital signals from each other to produce a control signal.

* * * * *